Dec. 20, 1966 J. B. MORGAN 3,292,256
PRESSURE BONDING OF DISSIMILAR METALS
Filed April 9, 1964
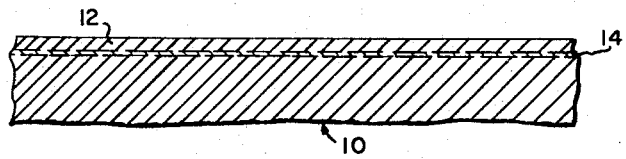
INVENTOR
JACK B. MORGAN
BY William N. Hogg
ATTORNEY United States Patent Office 3,292,256
Patented Dec. 20, 1966

3,292,256
PRESSURE BONDING OF DISSIMILAR METALS
Jack B. Morgan, New Kensington, Pa., assignor to Allegheny Ludlum Steel Corporation, Brackenridge, Pa., a corporation of Pennsylvania
Filed Apr. 9, 1964, Ser. No. 358,559
6 Claims. (Cl. 29—497.5)

This invention relates to the bonding of dissimilar metals and more particularly to bonding steel to aluminum.

In even more particular aspects this invention concerns the bonding of stainless steel soleplates to aluminum flatiron bodies.

Aluminum has found widespread use as a desirable material for flatirons. It is light, easily workable and has excellent heat transfer characteristics. However, aluminum has at least one very serious drawback to its use in flatirons in that it has a surface which tends to stick to the material being pressed, also the aluminum being soft tends to nick and mar when scraped over hard objects, such as zippers and the like, resulting in sharp edges which tend to snag on material being pressed. There have been several proposals for bonding stainless steel soleplates onto aluminum flatiron bodies to take advantage of the excellent surface characteristics of stainless steel and also to take advantage of aluminum's superior heat transfer properties and its desirable lightness. The proposed techniques for bonding the stainless steel soleplates to the aluminum have not been altogether satisfactory because of the inability to obtain strong coercive bonds at a reasonable cost.

It is therefore a principal object of this invention to provide an improved method of bonding dissimilar metals.

Yet another, more particular object of this invention is to provide an improved method of bonding stainless steel and aluminum.

A more specific object of this invention is the provision of an improved method of bonding stainless steel soleplates to aluminum flatiron bodies.

Still another object of this invention is the provision of an improved flatiron having an aluminum body with a stainless steel soleplate bonded thereto.

Still a further, more specific object of this invention is the provision of a method of bonding steel members to aluminum members which incorporates the use of a separate layer of aluminum between the members to provide the bond.

Yet another object of this invention is the provision of bonding dissimilar metals such as aluminum and steel in which a separate layer of aluminum is provided between the metals to be bonded.

These and other objects, together with a fuller understanding of the invention, will become apparent from the following description when taken in conjunction with the accompanying drawing in which:

The single figure is an enlarged view of a fragment of a stainless steel soleplate bonded to an aluminum flatiron body incorporating aluminum foil therebetween to provide the bond.

According to this invention, an aluminum flatiron body and a stainless steel soleplate of the desired shape are provided. The aluminum body may be of any conventional design and preferably is die cast with the heating elements being cast therein. If the flatiron is to be a steam iron, suitable steam ports are provided in the base of the casting and matching ports are also provided in the stainless steel soleplate. Any stainless steel grade may be bonded according to this invention and most are acceptable in use as soleplates, but austenitic stainless steels such as types 201, 211 and 304 are extremely well suited for this purpose and therefore preferred. Various thicknesses of stainless steel may be utilized although 0.020" thick material has been found to be satisfactory. In order to bond the stainless steel to the aluminum, the face of the aluminum body and the face of the soleplate to be bonded are scratch-brushed to remove any oxide and foreign material and to roughen the surfaces to facilitate bonding. A separate layer of aluminum, preferably in the form of aluminum foil, is provided between the faces of the stainless steel soleplate and the aluminum body. If the flatiron is a steam iron, the aluminum foil may have formed therein matching holes with those in the body and soleplate or these holes may be punched after bonding. The aluminum foil, which may be of any grade (3003 works quite well), should be cleaned of any grease or foreign material, preferably by degreasing in a solvent such as trichloroethylene, and then the aluminum body, the soleplate and the aluminum foil 14 are stacked together with the aluminum foil 14 in contact with the faces to be bonded of the aluminum body and soleplate. This assembly is then placed in a furnace and heated to between 700° F. and 1000° F., and preferably to between 750° F. and 850° F. The assembly is allowed to remain in the furnace until it has reached the temperature of the furnace and it is then removed and placed in a die (preferably preheated) with the stainless steel soleplate 12 disposed on top. The die is shaped to conform to the aluminum body 10 and provide support thereto to prevent lateral metal flow of the aluminum body during pressing to thereby prevent distortion of the body. Pressure is then applied to the stainless steel soleplate by a hydraulic ram or press. The pressure should be at least about 680 p.s.i., and preferably about 1700 p.s.i. or greater. This pressure will cause a bonding to occur securing the stainless steel soleplate to the aluminum body. A fragmentary sectional view of the bonded assembly is shown in the drawing with the reference character 10 designating the aluminum body, the reference character 12 designating the soleplate, and the reference character 14 representing the aluminum foil bonding the soleplate to the body.

The exact reason for the effectiveness of this method is not completely understood. However, it is believed that the sheet of aluminum foil provides a layer of material which will move or flow sufficiently to cause a bond to occur between the aluminum body 10 and the stainless steel soleplate 12.

It has also been found that instead of using aluminum foil, the layer of aluminum may be supplied by spraying aluminum on either the face of the soleplate or the face of the aluminum body.

It has been found that foil or a sprayed coating no thicker than 0.002" provides the best bond although some bonding will occur even with the thicker foil and coatings right up to the limit of foil thickness, i.e. 0.005". It has also been found that the minimum pressure required is 680 p.s.i. which pressure will provide some bond although separation of the stainless steel from the aluminum body can be readily accomplished. The greater the pressure applied, the better will be the bond obtained up until about 1700 p.s.i. where a completely satisfactory bond is obtained. Thus, it is desirable to apply at least about 1700 pounds per square inch pressure.

When the assembly is heated to less than 700° F., no bonding—or at best an unsatisfactory, weakbond—is obtained between the aluminum body and the stainless steel soleplate at the pressures used herein. The best bonding is obtained in the range of about 750° F. to 850° F., and when the assembly is heated to over 1000° F., a brittle intermetallic compound is formed between the stainless steel and the aluminum which prevents satisfactory bonding. It should be noted that these temperatures are the temperatures to which the assembly is heated and then transferred in air to a die where the bonding operation is performed. If the assembly is heated in the die and bonded without transfer therefrom, somewhat lower temperatures may be used and, hence, as used herein the minimum temperature is a limitation in the sense that this is the minimum temperature to which the assembly can be heated, and transferred for pressing at ambient temperatures. The 1000° F. temperature is a maximum in either case since the formation of brittle intermetallic compound above such temperature is what prevents satisfactory bonding.

It should also be noted that the temperature and pressure are somewhat interdependent, in that at the lower temperature ranges, greater pressures are required to obtain bonds similar to those obtained at higher temperatures and lower pressures. There also is some relationship between the thickness of the interposed aluminum foil or layer and the pressure required to obtain a satisfactory bond. The thinner the foil, the better will be the bond obtained at the lower pressures.

Although several embodiments of this invention have been shown and described, various adaptations and modifications may be made without departing from the scope and appended claims.

I claim:

1. A method of bonding a steel plate member to an aluminum member comprising, the steps of interleaving aluminum foil having a thickness of not greater than 0.05" between the faces of the members to be bonded, heating the assembled members and foil to between 700° F. and 1000° F., and then exerting a pressure of at least 680 p.s.i., and preferably about 1700 p.s.i. against said heated members to thereby cause the aluminum foil to bond the members together.

2. The method of claim 1 wherein the temperature to which the assembly is heated is from 750° F. to 850° F.

3. The method of claim 1 wherein the foil is not greater than .002" thick.

4. The method of claim 1 wherein the foil is degreased prior to assembling between the members.

5. A method of bonding a stainless steel soleplate member to an aluminum pressing iron body member without altering any of the dimensions of the aluminum pressing iron body member, comprising the steps of, scratch-brushing the face of the aluminum or stainless steel member to be bonded, providing a separate layer of aluminum not thicker than .002" between the faces of the members to be bonded, heating the assembled members and layer of aluminum to between 750° F. and 850° F., maintaining the aluminum member in a die, and exerting a pressure of at least 1700 p.s.i. on said assembled and heated members and aluminum layer to thereby cause the aluminum layer to bond the members together.

6. The method of claim 5 wherein said aluminum foil is degreased prior to heating.

References Cited by the Examiner

UNITED STATES PATENTS

| 2,782,498 | 2/1957 | Mushovic | 29—497.5 |
| 2,818,360 | 12/1957 | Porter | 29—197 X |
| 2,883,739 | 4/1959 | Russell | 29—196.2 |
| 2,908,073 | 10/1959 | Dulin | 29—488 |
| 3,010,190 | 11/1961 | Russell | 29—196.2 |
| 3,031,330 | 4/1962 | Hornick | 29—197 X |
| 3,093,885 | 6/1963 | Morrison | 29—197 X |
| 3,115,702 | 12/1963 | Scutt | 29—497.5 |
| 3,132,418 | 5/1964 | Fulford | 29—497.5 X |
| 3,173,202 | 3/1965 | Farber | 29—487 |
| 3,210,840 | 10/1965 | Ulan | 29—488 |

HYLAND BIZOT, *Primary Examiner.*